United States Patent
Lunardi

(10) Patent No.: US 10,633,294 B2
(45) Date of Patent: Apr. 28, 2020

(54) PROCESS FOR TREATING A SUBSTRATE MADE OF STONE MATERIAL

(71) Applicant: ANTOLINI LUIGI & C. S.P.A., Sant'Ambrogio di Valpolicella (VR) (IT)

(72) Inventor: Mauro Lunardi, Sant'Ambrogio di Valpolicella (IT)

(73) Assignee: Antolini Luigi & C. S.p.A., Sant'Ambrogio di (IT)

( * ) Notice: Subject to any disclaimer, the term of this patent is extended or adjusted under 35 U.S.C. 154(b) by 0 days.

(21) Appl. No.: 16/332,501

(22) PCT Filed: Sep. 8, 2017

(86) PCT No.: PCT/IB2017/055417
§ 371 (c)(1),
(2) Date: Mar. 12, 2019

(87) PCT Pub. No.: WO2018/051217
PCT Pub. Date: Mar. 22, 2018

(65) Prior Publication Data
US 2019/0233341 A1    Aug. 1, 2019

(30) Foreign Application Priority Data

Sep. 13, 2016 (IT) ........................ 102016000092198

(51) Int. Cl.
*C04B 41/45*  (2006.01)
*C04B 41/00*  (2006.01)
(Continued)

(52) U.S. Cl.
CPC ........ *C04B 41/4554* (2013.01); *B05D 3/0493* (2013.01); *C04B 24/12* (2013.01);
(Continued)

(58) Field of Classification Search
CPC .......... C04B 24/12; C04B 24/24; C04B 24/40; C04B 41/009; C04B 24/42; C04B 26/32;
(Continued)

(56) References Cited

U.S. PATENT DOCUMENTS

| 7,387,839 B2 | 6/2008 | Gueneau et al. |
| 2005/0221098 A1 | 10/2005 | Azzopardi et al. |
| 2013/0273319 A1 | 10/2013 | Chen et al. |

FOREIGN PATENT DOCUMENTS

| EP | 1860083 A2 * | 11/2007 | ............... B27K 3/15 |
| EP | 1860083 A2 | 11/2007 | |

(Continued)

OTHER PUBLICATIONS

Lee et al., "A Technique for Converting Perhydropolysilazane to SiOx at Low Temperature," Electrochemical and Solid-State Letters, 13 (1) H23-H25 (2010). (Year: 2010).*

(Continued)

*Primary Examiner* — William P Fletcher, III
(74) *Attorney, Agent, or Firm* — Howson & Howson LLP

(57) ABSTRACT

A process for treating a substrate made of stone material, preferably in the form of slabs, is provided which process improves the mechanical, thermal and catalytic properties of the substrate. The process includes applying a protective coating to the outer surface of the substrate made of stone material and, to improve adhesion of the protective coating to the outer surface of the substrate, preliminarily subjecting the substrate to one or more pre-treatment steps that eliminate or reduce the presence of pollutants and porosity on the surface of the substrate. The pre-treatment of the substrate made of stone material comprises at least one step of treatment under vacuum conditions inside an autoclave, preferably under pressure conditions lower than $10^{-2}$ mbar. Then, after having brought the substrate back to ambient (Continued)

pressure, it is possible to apply and effectively adhere the protective coating to the surface of the stone material.

20 Claims, 1 Drawing Sheet

(51) Int. Cl.
| | |
|---|---|
| *C04B 41/50* | (2006.01) |
| *C04B 41/49* | (2006.01) |
| *C04B 24/40* | (2006.01) |
| *C04B 32/00* | (2006.01) |
| *C04B 40/00* | (2006.01) |
| *C04B 41/46* | (2006.01) |
| *C04B 26/32* | (2006.01) |
| *C04B 24/12* | (2006.01) |
| *C04B 24/42* | (2006.01) |
| *C04B 24/24* | (2006.01) |
| *C04B 41/64* | (2006.01) |
| *C04B 41/61* | (2006.01) |
| *C04B 41/62* | (2006.01) |
| *C04B 41/63* | (2006.01) |
| *B05D 3/04* | (2006.01) |
| *C04B 41/60* | (2006.01) |
| *C04B 41/68* | (2006.01) |

(52) U.S. Cl.
CPC .............. *C04B 24/24* (2013.01); *C04B 24/40* (2013.01); *C04B 24/42* (2013.01); *C04B 26/32* (2013.01); *C04B 32/00* (2013.01); *C04B 40/00* (2013.01); *C04B 40/0089* (2013.01); *C04B 41/00* (2013.01); *C04B 41/009* (2013.01); *C04B 41/0018* (2013.01); *C04B 41/45* (2013.01); *C04B 41/455* (2013.01); *C04B 41/457* (2013.01); *C04B 41/4515* (2013.01); *C04B 41/4529* (2013.01); *C04B 41/4537* (2013.01); *C04B 41/46* (2013.01); *C04B 41/49* (2013.01); *C04B 41/4905* (2013.01); *C04B 41/495* (2013.01); *C04B 41/4922* (2013.01); *C04B 41/4927* (2013.01); *C04B 41/4938* (2013.01); *C04B 41/4944* (2013.01); *C04B 41/4983* (2013.01); *C04B 41/5035* (2013.01); *C04B 41/5089* (2013.01); *C04B 41/60* (2013.01); *C04B 41/61* (2013.01); *C04B 41/62* (2013.01); *C04B 41/63* (2013.01); *C04B 41/64* (2013.01); *C04B 41/68* (2013.01); *B05D 2203/30* (2013.01)

(58) Field of Classification Search
CPC ...... C04B 32/00; C04B 40/00; C04B 40/0089; C04B 41/00; C04B 41/0018; C04B 41/45; C04B 41/4515; C04B 41/4529; C04B 41/4537; C04B 41/455; C04B 41/4554; C04B 41/457; C04B 41/46; C04B 41/49; C04B 41/4905; C04B 41/5089; C04B 41/5035; C04B 41/4922; C04B 41/4927; C04B 41/4938; C04B 41/4944; C04B 41/495; C04B 41/4983; C04B 41/60; C04B 41/61; C04B 41/62; C04B 41/63; C04B 61/64; B05D 3/0493; B05D 2203/30

See application file for complete search history.

(56) References Cited

FOREIGN PATENT DOCUMENTS

| | | | |
|---|---|---|---|
| WO | 2009/138945 A1 | 11/2009 | |
| WO | WO-2009138945 A1 * | 11/2009 | ........... C04B 41/009 |

OTHER PUBLICATIONS

Brinker, C.J., "Hydrolysis and Condensation of Silicates: Effects on Structure," Journal of Non-Crystalline Solids 100 (1988) 31-50. (Year: 1988).*

* cited by examiner

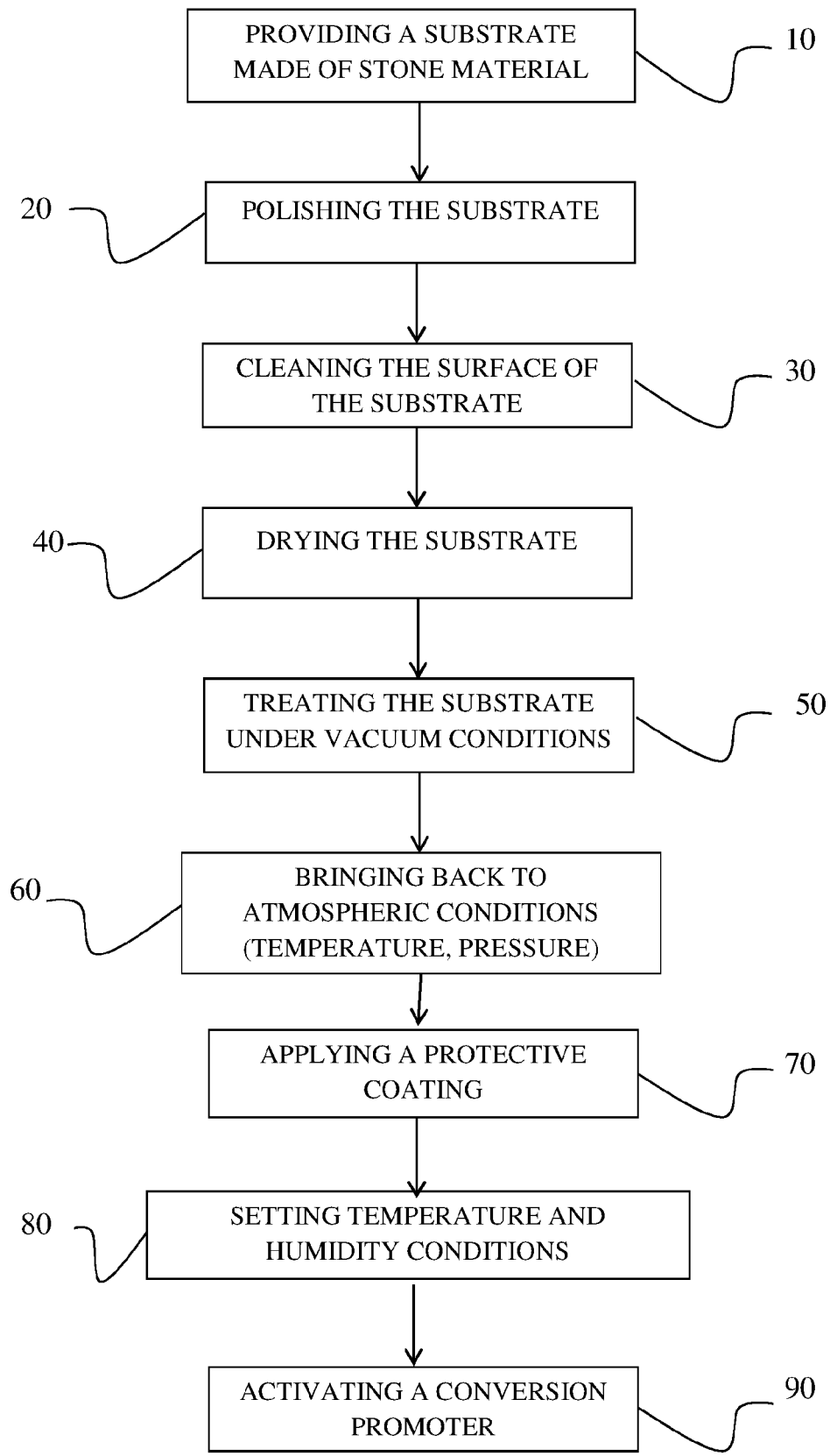

PROCESS FOR TREATING A SUBSTRATE MADE OF STONE MATERIAL

TECHNICAL FIELD

The present invention relates to a process for treating a substrate made of stone material, such as natural stone, marble and the like, which substrate preferably is in the form of slabs.

More particularly, the present invention relates to a process for treating a substrate made of stone material which allows to improve the mechanical, thermal and catalytic properties of said substrate.

Prior Art

It is well known to apply coatings in the form of transparent films to slabs made of stone material, which coatings allow to protect the underlying slab from external agents, and in particular from the risk of corrosion.

More particularly, the use of particles of nanometric size for producing such coatings allows to provide the materials with new and better mechanical, thermal and catalytic properties.

So-called "nano-fillers" are particles of nanometric size (1-100 nm) which are used for manufacturing enamels, paints and the like and which can be used for coating slabs made of stone material.

The shape, size, surface morphology and dimensional dispersion of said nanoparticles determine the mechanical and physical properties of the matrix in which they are received and, ultimately, of the obtained coating.

In particular, enamels, paints, sealants, adhesives and the like are known which employ metal oxides in the form of nanoparticles and which allow to provide the slab made of stone material to which they are applied with improved properties in terms of mechanical strength and stiffness, abrasion resistance, corrosion resistance, chemical resistance, thermal conductivity, reduced gas permeability.

Copper oxide (CuO), aluminum oxide ($Al_2O_3$), especially in mineral form (Corundum), zinc oxide (ZnO), cerium oxide ($CeO_2$) and titanium dioxide ($TiO_2$) may be cited as some of the metal oxides which are most commonly used.

In particular, titanium dioxide is particularly used and appreciated for its corrosion resistance properties as well as for its photocatalytic properties: this means that titanium dioxide is a substance which is highly reactive to UV rays present in normal solar radiation and, when it is hit by UV rays, it can convert pollutants such as sulfur oxides (SOx), nitrogen oxides (NOx), benzene, bacteria and moulds into sodium and calcium nitrate salts and $CO_2$, which are then removed from the surfaces by wind and rain. This mechanism has caused titanium dioxide to be studied as an element suitable for manufacturing self-cleaning and antibacterial paints and varnishes, capable of achieving a high level of pollutant removal, thus greatly improving the quality of air and environment.

Examples of coatings for slabs made of stone material with protective layers containing titanium dioxide and/or other metal oxides in the form of nanoparticles can be found, for example, in documents WO 2012/076491, EP 1390563 and FR 2838735.

However, known coatings are not free from drawbacks.

Indeed, several tests have shown that the coatings of the above-described type are inert with respect to corrosive phenomena, but they exhibit many problems, mainly due to considerable difficulties in adhesion between the coating and the underlying substrate made of stone material.

Further drawbacks are related to the excessively high porosity of said coatings, which does not allow to ensure an effective "barrier effect" and which leads to formation of cracks and breaks during the drying step.

Another cause of cracks and breaks formation is related to the large difference between the thermal expansion coefficient of the coating and the one of the underlying substrate made of stone material.

The main object of the present invention is to overcome the drawbacks of prior art by providing a process for treating a substrate made of stone material which allows to coat such substrate with a coating capable of providing said substrate with improved mechanical, thermal and catalytic properties, with particular reference to corrosion resistance.

This and other objects are achieved by the process for treating a substrate made of stone material as claimed in the appended claims.

SUMMARY OF THE INVENTION

Due to the fact that the process according to the invention, before the step of applying the coating, provides for one or more steps of "pre-treating" the substrate made of stone material to be coated, it is possible to eliminate—or at least reduce—the presence of pollutants and porosity on the surface of said substrate, so as to allow the coating which is successively applied to adhere optimally.

According to the invention, said "pre-treatment" of the substrate made of stone material comprises at least one step of treatment under vacuum conditions inside an autoclave, preferably at pressure conditions lower than $10^{-2}$ mbar.

Afterwards, once the substrate made of stone material has been brought back to ambient pressure, the coating can be applied, upon selection of the most suitable product according to the structure and/or the petrographic composition of the stone material.

Advantageously, the process according to the invention—due to the presence of one or more pre-treatment steps—makes it possible to use coatings in sol-gel formulations.

According to a preferred embodiment of the invention, in order to take into account that the properties of the stone material vary not only from a type of used stone material to another one, but also, the same stone material being used, from an extraction block to another one, the "pre-treatment" of the substrate made of stone material further comprises the steps of:

polishing the substrate made of stone material,
cleaning the surface of the substrate made of stone material with a solvent,
drying the substrate made of stone material.

According to a preferred embodiment of the invention, silicon-based materials are preferably used for the coating of the substrate made of stone material.

BRIEF DESCRIPTION OF THE DRAWINGS

Further features and advantages of the invention will become more evident from the following detailed description of a preferred embodiment thereof, provided by way of non-limiting example with reference to the accompanying FIGURE, which schematically shows a block diagram illustrating a process for treating a substrate made of stone material according to a preferred embodiment of the invention.

DETAILED DESCRIPTION OF A PREFERRED EMBODIMENT OF THE INVENTION

A preferred embodiment of the process according to the invention will be now described in greater detail with reference to the block diagram of the attached FIGURE.

In a first step 10 of the process according to the invention, a substrate made of stone material, preferably in the form of a slab, is provided.

Said substrate can be made of natural stone, marble, limestone, granite or other stone materials which are commonly used in the construction industry.

Then, before coating the substrate made of stone material with a protective coating, the process of the invention provides for carrying out one or more "pre-treatment" steps, intended to optimize the application of said protective coating, especially in terms of adhesion.

In the illustrated embodiment, said "pre-treatment" of the substrate made of stone material initially comprises a polishing step 20 of the substrate.

The polishing step 20 can be carried out, for instance, by using abrasive grinding wheels having a suitable composition and grain size, selected according to the specific stone material to be treated. However, other techniques and/or tools commonly known to those skilled in the art may also be used.

Subsequently, the substrate made of stone material is subjected to a surface cleaning step 30.

This surface cleaning step 30 is intended to completely eliminate any residue of pollutants present in ambient air and/or in the working environment from the surface of the substrate made of stone material. Said surface cleaning step 30 can be carried out, for instance, by using suitable solvents. However, other techniques, tools and/or substances commonly known to those skilled in the art may also be used.

Afterwards, in the preferred embodiment described herein, the process according to the invention provides for a drying step 40, intended to remove surface moisture from the substrate made of stone material.

Preferably, said drying step 40 also comprises heating said substrate made of stone material and raising its temperature to a value preferably between 50 and 60° C.

At this stage, according to the invention the "pre-treatment" provides for a step of treatment under vacuum conditions 50 inside an autoclave.

More particularly, the step of treatment under vacuum conditions 50 is carried out under pressure conditions within the autoclave preferably lower than $10^{-2}$ mbar, and even more preferably of about $8.3 \times 10^{-3}$ mbar.

Said step of treatment under vacuum conditions 50 carried out inside an autoclave is of particular importance in order to enhance the following adhesion of the protective coating to the substrate made of stone material.

Said step exploits the principle of the liquid-vapour phase transition and, thanks to the high vacuum conditions, allows to eliminate the residues present in the autoclave and essentially consisting of residual water vapour and, for the remaining portion, of pollutants present in the atmosphere, such as in particular hydrocarbons.

In the case of multi-component systems, the phase transition from liquid phase to gaseous phase involves crossing a two-phase liquid-vapour zone, which is delimited by two threshold conditions, respectively called "dew point"—between the zone of existence of the gaseous phase and the zone of existence of the vapour-liquid mixture—and "bubble-point"—between the zone of existence of the liquid phase and the zone of existence of the liquid-vapour mixture.

The "dew point" represents the condition in which the two-phase liquid-vapour mixture becomes saturated with vapour. In other words, beyond the dew point (i.e. at higher temperature and/or lower pressure) only vapour is present, whereas below the dew point (i.e. at a lower temperature and/or higher pressure) the system is a two-phase liquid-vapour system.

By using the dew point, in the process according to the invention it is possible to achieve a complete elimination of all residual moisture which in any case is present at the end of the drying phase 40 and which could inhibit the following adhesion of the coating to the surface of the substrate made of stone material.

Such a complete elimination would not be feasible under ambient conditions. On the contrary, inside the autoclave vacuum conditions are used for affecting the vapour pressure of the residual substances in order to facilitate their removal: thanks to the reduction of the pressure on the surface of the stone material, it is possible to remove at first the residues present in the atmosphere and then those present on the surface of the stone material, without formation of new residues on the surface itself.

The "bubble point" represents the condition in which the first bubble is formed in the liquid phase.

By using the "bubble point", in the process according to the invention it is possible to prepare the micro-porosities present on the surface of the substrate made of stone material for the adhesion of the coating, without the risk that any residual particles create a barrier between the surface of the substrate and the catalyst which is subsequently introduced.

The step of treatment under vacuum conditions 50 inside the autoclave may use both liquid phase catalysts and gaseous phase catalysts. Preferably, the catalyst is selected according to the conditions under which said step is carried out, with particular reference to the degree of vacuum.

In a particularly preferred embodiment of the invention, a mixture of Argon (Ar) at a feeding rate of about 100 SCCM (Standard Cubic Centimeters per Minute) and disiloxane in gaseous phase at about 50 SCMM is used as a catalyst.

Under these conditions, for each slab made of stone material to be treated, it takes about 8 minutes to reach the vacuum degree appropriate for introducing the above mixture. After that, the treatment in the presence of the catalyst mixture lasts about 15 minutes.

The catalyst mixture on one hand allows to remove the water vapour which is still present after the drying step 40 and after the vacuum conditions are reached; on the other hand, such mixture is deposited on the surface of the slab made of stone material and creates a film on said surface, which films acts as a "primer" in view of the following application of the protective coating.

Subsequently, the process according to the invention provides for a step of restoring the temperature and pressure ambient conditions 60 inside the autoclave and—under these conditions—a step of applying the protective coating 70.

The suitable protective coating is advantageously selected according to the structure and/or the petrographic composition of the substrate made of stone material to be treated.

Silicon-based compounds are particularly advantageous for obtaining said protective coating.

In an embodiment of the invention, the protective coating is provided in the form of sol-gel formulation. The sol-gel technology starts from organometallic or inorganic precursors (in this case silicon) in solution, which, through hydrolysis and condensation processes, form colloidal solutions, called "sol", of oxide nanoparticles (in this case $SiO_2$). After deposition of "sol", formation of a "gel" (a continuous inorganic lattice containing an interconnected liquid phase) takes place through hydrolysis and condensation reactions. Thermal post-treatments of drying and solidifying are generally used for eliminating the liquid phase from the gel, promoting further condensation and enhancing mechanical properties. In this way, several two-dimensional lattices (surface films) having a thickness lower than 1 micron can be obtained, which lattices allow to obtain many functional properties on any substrate.

The effective use of sol-gel formulations is made possible by the "pre-treatment" provided by the process according to the invention, and specifically by the step of treatment under vacuum conditions 50 inside an autoclave.

In an alternative embodiment of the invention, the protective coating comprises compounds of the siloxane family.

In a further alternative embodiment of the invention, the protective coating comprises compounds of the polysilazane family.

According to studies and tests performed by the Applicant, both the above-mentioned families have properties that are well suited to be used for the production of film coatings of nanometric size showing good corrosion resistance properties and good water repellency properties.

Most preferably, compounds of the polysilazane family have proven to be suitable as materials for the protective coating.

The main feature of polysilazanes is the presence of a backbone in which nitrogen is in a bridge position between two Si atoms. The length of the Si—N bond is usually within the range of 1.70 to 1.75 Å, while the bond angle is strongly affected by the substituent groups which are present on both silicon and nitrogen. The presence of highly polarized Si—N bonds makes these compounds highly susceptible to hydrolysis reactions, favored by the presence of water or protic solvents, such as alcohols or acids: such reactions are thermodynamically favored and lead to the formation of silica ($SiO_2$) and ammonia, or amines in the case of N-substituted precursors. These instability problems make polysilazanes difficult to synthesize and to study, as it is always necessary to have an inert atmosphere (nitrogen or argon) to avoid degradation thereof.

Although polysilazanes can be regarded as analogues of polysiloxanes, with oxygen instead of nitrogen, so far they have not enjoyed the same interest of the academic and industrial world due to these instability problems.

More recently, however, the use of these precursors for obtaining highly purified $SiO_2$ and crystalline Si has attracted the attention of the industrial world, which is reflected in the availability of various polysilazane-based and polycarbosylazane-based compounds on the market, such as PHPS (perhydropolysilazane), PVS (polyvinylsilazane), PUMVS (polyureamethylvinylsilazane) and many others.

Conversion of PHPS into $SiO_2$ is mainly based on the fact that the Si—N bond is energetically disadvantaged with respect to the Si—O bond and, under controlled moisture conditions, the hydrolysis reaction leads to the formation of silicon oxides.

By using this principle, it is possible to deposit the PHPS in the form of thin film and to obtain materials having properties similar to those obtained from alkoxide derivatives (Sol-Gel process), while allowing to exploit the better adhesive properties of these compounds, which are essential for some specific types of stone materials such as limestone and part of carbonate-based materials.

However, the conversion process of PHPS into $SiO_2$ under normal conditions is kinetically disadvantaged and it would proceed with relative slowness.

For this reason, when using compounds of the polysilazane family as a protective coating, the process according to the invention provides for a step of establishing controlled temperature and humidity conditions 80 inside the autoclave, and a step of activating a promoter 90 of conversion of said coating into $SiO_2$.

The step of activating the promoter 90 can take place by introducing acid or basic vapours into the autoclave, respectively, depending on the product that has been selected as coating.

Due to these measures, a rapid and controlled reaction can be obtained.

The promoter of the conversion process uses pH-dependent catalytic mechanisms, for instance by exposure to vapours of corresponding solutions, and generates a general increase in the conversion rate, with a stronger effect for higher pH vapours.

The choice of the vapour to be used as a promoter also depends on the actual baseness/acidity of the vapours.

In a preferred embodiment of the invention, ammonia and/or water vapours are used as promoters of the conversion of PHPS into $SiO_2$.

Both when using conversion of polysilazanes (as in the case of PHPS) with the aid of conversion promoters or formulations made with sol-gel based technology with solvent basis or siloxane-based formulations, the final result of the process is the formation of a $SiO_2$ layer.

This layer, having a thickness of a few microns, has been found to be able to increase the mechanical, thermal and catalytic properties (hardness, porosity, corrosion resistance, thermal resistance, and so on) of stone materials of different types and geological families, without deteriorating their beauty and natural aesthetics.

A possible implementation of the process according to the invention, provided by way of mere example, could take place as follows:

- a substrate (slab) made of marble, obtained from a standard production system, is provided;
- the slab is cleaned by brushing it with a mixture of isopropylene and water for about 8 minutes;
- the slab is then inserted into an oven for being dried at a temperature of about 58° C. for a period of about 10 minutes;
- the slab is inserted into an autoclave and vacuum conditions are established inside the autoclave (pressure of about $8 \times 10^{-4}$ mbar) and the slab is kept under these conditions for about 4 minutes;
- then a mixture of Argon and disiloxane with rates of about 100 SCCM and about 50 SCMM, respectively, is introduced into the autoclave; the catalysing time of the mixture on the slab is about 10 minutes;
- at the end of this process the slab is brought back to pressure and temperature ambient conditions and further protected by means a protective solution in the form of a paint;
- an additional drying step for a period of about 5 minutes is carried out;
- finally, the slab is wrapped in nylon by using standard techniques.

It is clear that the foregoing description has been provided for the sole purpose of clarifying the invention, without any limiting purpose, and several modifications and variants within the reach of those skilled in the art are possible without departing from the scope of protection as defined by the appended claims.

The invention claimed is:

1. A process for treating a substrate made of stone material, comprising:
    providing a substrate made of stone material, in the shape of a slab; and
    applying a protective coating to the surface of the substrate made of stone material;
    wherein said process, before applying the protective coating, comprises pre-treating the substrate made of stone material, including treating the substrate made of stone material under vacuum conditions inside an autoclave in the presence of a liquid catalyst.

2. The process according to claim 1, wherein the process includes, before treating the substrate made of stone material under vacuum conditions, polishing the substrate made of stone material.

3. The process according to claim 1, wherein the process includes, before treating the substrate made of stone material under vacuum conditions, cleaning the surface of the substrate made of stone material.

4. The process according to claim 1, wherein the process includes, before treating the substrate made of stone material under vacuum conditions, drying the substrate made of stone material.

5. The process according to claim 1, wherein treating the substrate made of stone material under vacuum conditions is carried out at a pressure inside the autoclave lower than $10^{-2}$ mbar.

6. The process according to claim 1, wherein, after treating the substrate made of stone material under vacuum conditions and before applying the protective coating, the inside of the autoclave is brought back to atmospheric temperature and pressure.

7. The process according to claim 1, wherein the protective coating is a silicon-based protective coating.

8. The process according to claim 7, wherein the silicon-based protective coating is provided as a sol-gel formulation.

9. The process according to claim 7, wherein the silicon-based protective coating contains compounds of the group of siloxanes.

10. The process according to claim 7, wherein the silicon-based protective coating contains compounds of the group of polysilazanes.

11. The process according to claim 10, wherein the silicon-based protective coating contains a compound selected from the group comprising PHPS (perhydropolysilazane), PVS (polyvinylsilazane), PUMVS (polyureamethylvinylsilazane).

12. The process according to claim 10, wherein the process, after applying the protective coating to the surface of the substrate made of stone material, comprises:
    setting controlled temperature and humidity conditions inside the autoclave; and
    activating one or more promoters of the conversion of polysilazanes into $SiO_2$.

13. The process according to claim 12, wherein the promoters of the conversion of polysilazanes into $SiO_2$ include ammonia and/or water vapours.

14. A process for treating a substrate made of stone material, comprising:
    providing a substrate made of stone material, in the shape of a slab; and
    applying a protective coating to the surface of the substrate made of stone material;
    wherein said process, before applying the protective coating, comprises pre-treating the substrate made of stone material, including treating the substrate made of stone material under vacuum conditions inside an autoclave in the presence of a gaseous catalyst.

15. The process according to claim 14, wherein the catalyst comprises a mixture of Argon and disiloxane.

16. The process according to claim 14, wherein the process includes, before treating the substrate made of stone material under vacuum conditions, polishing the substrate made of stone material.

17. The process according to claim 14, wherein the process includes, before treating the substrate made of stone material under vacuum conditions, cleaning the surface of the substrate made of stone material.

18. The process according to claim 14, wherein treating the substrate made of stone material under vacuum conditions is carried out at a pressure inside the autoclave lower than $10^{-2}$ mbar.

19. The process according to claim 14, wherein, after treating the substrate made of stone material under vacuum conditions and before applying the protective coating, the inside of the autoclave is brought back to atmospheric temperature and pressure.

20. The process according to claim 14, wherein the protective coating is a silicon-based protective coating.

* * * * *